US012803176B2

(12) United States Patent
Hardy et al.

(10) Patent No.: US 12,803,176 B2
(45) Date of Patent: Nov. 17, 2026

(54) OPTICALLY TRANSPARENT REFLECTOR METASURFACE FOR MILLIMETER WAVE BEAMFORMING

(71) Applicant: Dell Products L.P., Round Rock, TX (US)

(72) Inventors: David Fernando Hardy, Ottawa (CA); Keigan Macdonell, Ottawa (CA); Shulabh Gupta, Ottawa (CA); Tejinder Singh, Manotick (CA); Navjot Kaur Khaira, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 41 days.

(21) Appl. No.: 18/968,843

(22) Filed: Dec. 4, 2024

(65) Prior Publication Data

US 2026/0155582 A1 Jun. 4, 2026

(51) Int. Cl.
*H01Q 15/14* (2006.01)

(52) U.S. Cl.
CPC ................................ *H01Q 15/147* (2013.01)

(58) Field of Classification Search
CPC ............................ H01Q 15/14; H01Q 15/147
See application file for complete search history.

(56) References Cited

U.S. PATENT DOCUMENTS

2024/0204414 A1* 6/2024 Lemesh ............. H01Q 15/0013

FOREIGN PATENT DOCUMENTS

CN 113690599 B * 11/2022 ......... H01Q 15/0086
JP 2008219125 A * 9/2008 ............. H01Q 15/14

* cited by examiner

*Primary Examiner* — Hoang V Nguyen
(74) *Attorney, Agent, or Firm* — Amin, Turocy & Watson, LLP

(57) ABSTRACT

The technology described herein is directed towards a reflector metasurface with high optical transparency such as for reflecting beamformed millimeter wave signals. The reflector includes unit cells of reflecting elements (resonator rings) above a virtually optically transparent dielectric substrate, which is above a perforated metal ground plane. The ground plane is perforated to increase optical transparency, unlike a flat metal sheet. In one implementation, the perforated ground plane includes circular openings arranged as a honeycomb mesh pattern. The geometries of the reflecting elements can be selected to achieve a certain phase distribution across the reflectarray surface, which will then cause incident radiation to be reflected (beamformed) in a particular direction. With the mesh ground plane, a sufficiently large phase range on the order of 330 degrees is achieved, along with a high percentage of optical transparency of the metasurface.

20 Claims, 10 Drawing Sheets

OPTICALLY TRANSPARENT REFLECTOR METASURFACE FOR MILLIMETER WAVE BEAMFORMING

BACKGROUND

Radio frequency (RF) signals in the millimeter-wave (mm-wave) band (28-110 gigahertz, including the Ka, V, and W bands) and beyond will deliver the high data rates and throughput of next-generation wireless communication networks. A major disadvantage of mm-wave wireless links is their sharp path loss due to physical obstacles, including materials constituting common structures found in urban or indoor environments, which absorb and scatter such high-frequency radio waves.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
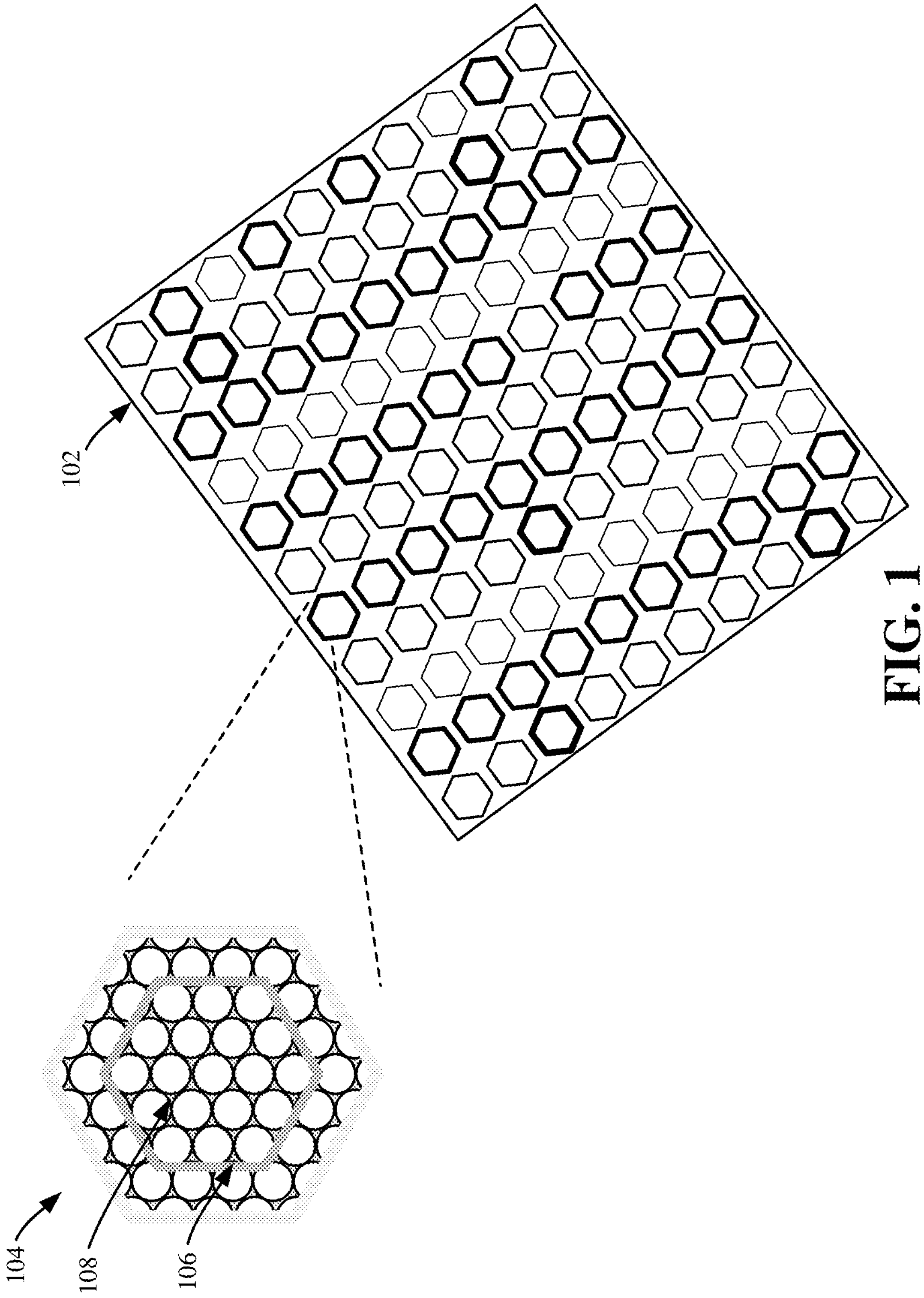
FIG. 1 is a two-dimensional (2D) representation of an example reflective metasurface layout for unit cells, including an enlarged unit cell showing additional details of a honeycomb ground plane beneath a hexagonally-shaped ring resonator, in accordance with various example embodiments and implementations of the subject disclosure.

The technology described is generally directed towards an optically transparent reflection-type metasurface that controls the reflection of millimeter-wave (mm-wave) signals through engineered windows and around obstacles, whereby mm-wave signals can be reflected into otherwise shadowed locations, including interior locations. In addition to reflecting the signals, the transparent metasurface is able to beamform the signals into a desired beam pattern, e.g., a narrow beam with higher array gain to focus on a more particular spot, or a wider beam with lesser array gain to focus on a more general area.

In general, metasurfaces (sometimes referred to as reconfigurable intelligent surfaces) are a generally two-dimensional synthetic structure, having electromagnetic (EM) scattering properties that can be finely tuned to achieve anomalous reflection and transmission of wireless signals. A metasurface includes an array of resonant structures (unit cells) that are sub-wavelength in periodicity, such that by modulating the scattered magnitude and phase on a per-unit cell basis, a near-continuous complex reflectivity and transmittivity profile can be achieved. Such reflectarrays are built with a dielectric substrate that is sandwiched with reflecting elements on one side, and a metal ground plane on the other; a feed antenna is used to illuminate the reflectarray surface and the reflecting elements steer the incident radiation into a particular direction. The geometries of the reflecting elements can be strategically selected to achieve a certain phase distribution across the reflectarray surface, which will then cause incident radiation to be reflected in a particular direction. Thus, through establishing a phase profile, for example, the main lobe of the scattered field can be steered (beamformed) towards a desired target in reflection or transmission.

In one example implementation, the transparent metasurface is constructed as a low-profile surface, in which each unit cell has a relatively small surface area ring resonator (e.g., in a single metal layer) above a mesh ground plane, with an optically transparent substrate in between. Optical transparency of ninety-one percent (91%) is achieved in the ground plane, with an overall unit cell transparency dependent on the dimensions of the metal rings; (there is a potential to increase the transparency of the hexagonal rings by fabricating them with a transparent conductive oxide). At the same time, a sufficiently large phase range on the order of 330 degrees is achieved, which is an adequate range for a practical reflective metasurface.

Various example embodiments of the technology described herein thus describe an optically transparent metasurface technology that intelligently steers incoming electromagnetic waves, including those used for next-generation wireless networks, around obstacles. The optically transparent metasurface is based on unit cells that can each have different phase profiles to accomplish beam steering.

It should be understood that any of the examples herein are non-limiting. Thus, any of the embodiments, aspects, concepts, structures, functionalities or examples described herein are non-limiting, and the technology may be used in various ways that provide benefits and advantages in communications and wireless technology in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments of the subject disclosure will now be described more fully hereinafter with reference to the accompanying drawings in which example components, graphs and/or operations are shown. In the following description, for purposes of explanation, numerous specific details are set forth in order to provide a more thorough understanding of the various embodiments. However, the subject disclosure may be embodied in many different forms and should not be construed as limited to the examples set forth herein.

FIG. 1 shows a generalized representation of an example (substantially) optically transparent reflective-type metasurface 102, (not showing the resonating elements nor the grid structure of the ground plane), including a hexagonally-shaped group of unit cells arranged as an array. While the unit cells are shown as hexagonally-shaped in FIG. 1, this is a nonlimiting example, and any suitable shape can be used, typically, but not necessarily, regular polygons of the same shape. The metasurface 102 can be static, meaning that the metasurface, once the unit cells are configured to a defined phase profile, remains unchanged.

Note that like the unit cells, the overall rectangular shape of the metasurface 102 in FIG. 1 is only one arbitrary, nonlimiting example, as any metasurface shape can be used as long as the shape results in a resonating surface that resonates to reflect the incoming electromagnetic wave at the desired design frequency with the defined phase profile. Further note that while 11×10 unit cells are shown, this is also a nonlimiting example, as any practical number of unit cells of any practical size can be used with any practical size metasurface; indeed, the surface 102 depicted in FIG. 1 can be considered a portion of a larger surface with more unit cells. Thus, the numbers of (unit cells) and their sizes relative to the surface (which also can be of different dimensions) are not intended to be representative of actual numbers and sizes, and are only depicted for purposes of explanation and not intended to convey relative numbers or sizes. Indeed, in any of the drawing figures herein, the relative sizes, data results shown in the graphs or anything else shown are only presented for purposes of explanation.

One unit cell 104 of the group of unit cells of the static surface is shown in FIG. 1 enlarged relative to the depicted example static metasurface 102. In this enlarged view, the resonating element is depicted as a hexagonally-shaped metallic ring 106. Notwithstanding, this is only one example, and any shape ring structure such as square, rectangular, circular and so on may be used, as long as the resonating element resonates at or relatively close to the designed frequency.

Also shown in the enlarged view of the unit cell 104 is a hexagonal lattice grid structure, commonly referred to as a honeycomb lattice or mesh grid structure ground plane 108 beneath the ring resonator 106, e.g., with a dielectric substrate below the ring resonator 106 (for support and fabrication) and above the honeycomb grid structure ground plane 108. The substrate (e.g., fused silica) is virtually completely optically transparent, or at least substantially optically transparent. While circular openings are shown in the honeycomb grid structure 108, this is a nonlimiting example, and other shaped openings and/or patterns for the openings are feasible. Note that the honeycomb grid structure 108 has been found to provide desirable results as described herein.

Figure 2:
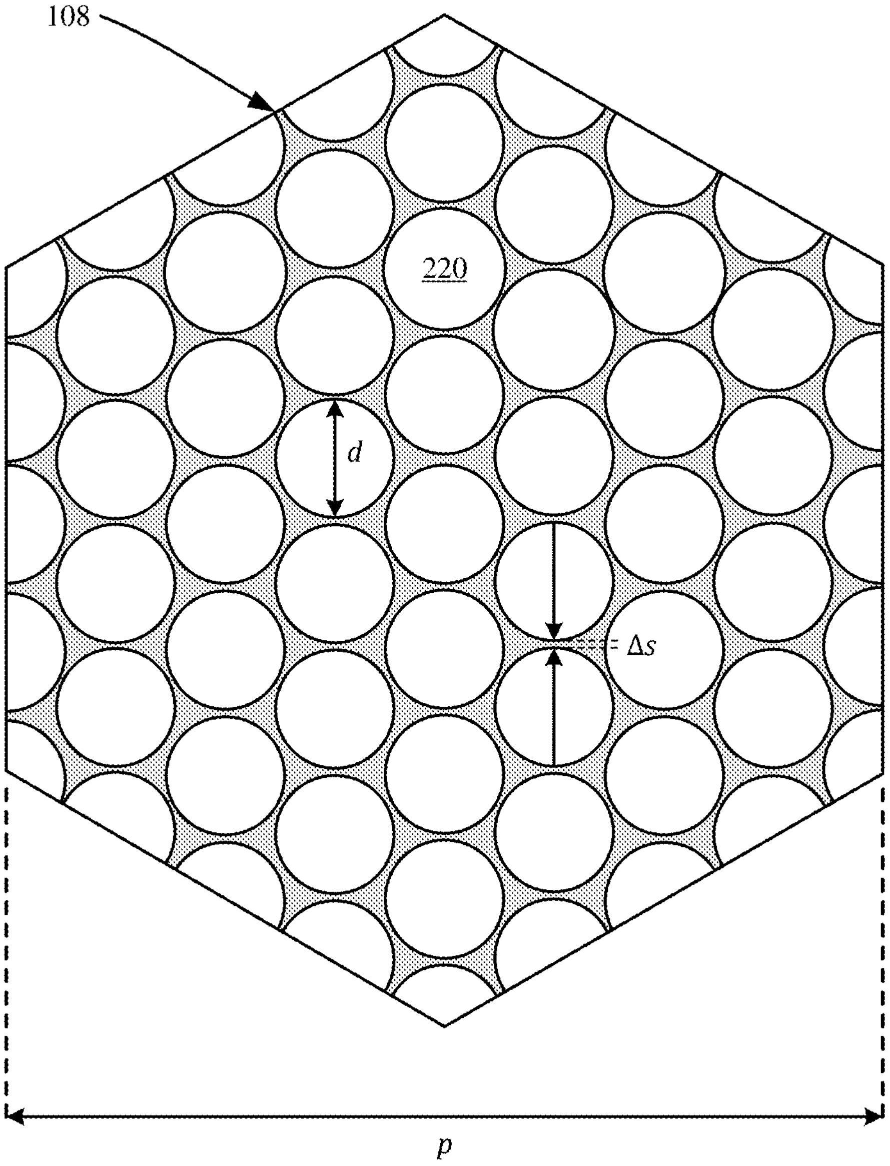
FIG. 2 is a 2D representation of an example honeycomb ground plane with openings for a hexagonally-shaped unit cell, in accordance with various example embodiments and implementations of the subject disclosure.

FIG. 2 shows example dimensions of the patterned openings (relatively larger circular perforations/holes/punctures), one of which is labeled 220, in the grid structure ground plane 108. In this example, the period p for each honeycomb unit cell is p=2.68 mm; the diameter d of the perforations in the honeycomb ground plane is d=0.19 mm and the smallest spacing Δs between adjacent perforations is Δs≈6.5 μm.

Figure 3:
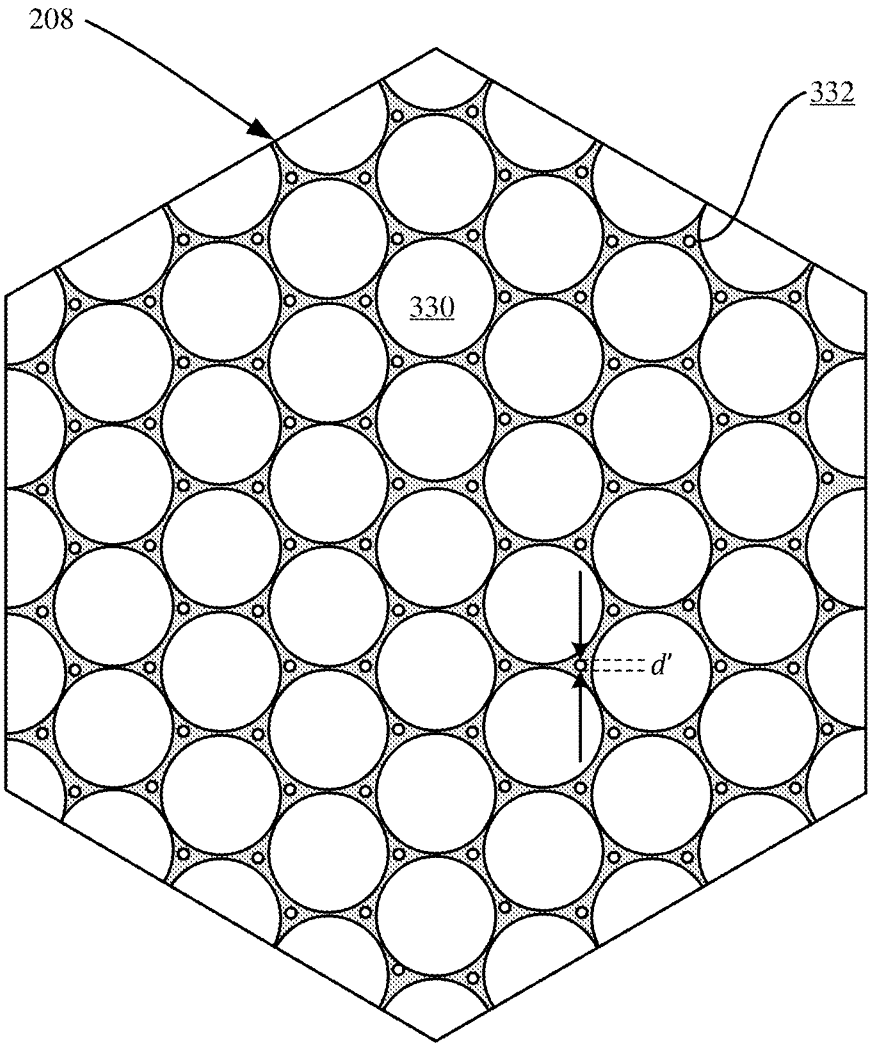
FIG. 3 is a 2D representation of an example honeycomb ground plane with openings for a hexagonally-shaped unit cell, with additional perforations between the openings to increase optical transparency, in accordance with various example embodiments and implementations of the subject disclosure.

FIG. 3 shows an alternative example grid structure ground plane 208 that includes additional small perforations, one of which is labeled 332, added in between the larger openings (one of which is labeled 330). In this example, the diameter d' of the additional small perforations are d'≈25 μm. As will be understood, the additional small perforations help increase the transparency of the ground plane grid structure 208, relative to the grid structure 108 of FIG. 2, with some small amount (but likely acceptable in most scenarios) of degradation in the reflection performance, relative to honeycomb ground plane without the additional perforations, as described herein.

With a flat perfect electric conductor (PEC) ground plane sheet, all the incoming radiation is reflected back, meaning the magnitude of the reflection would be equal to 1 on the linear scale, or 0 dB (log (1)) on a logarithmic scale. The phase of the reflected waves relative to the incident would be 180°. Consider FIGS. 2 and 3, which are two examples of honeycomb mesh ground planes for a hexagonal unit cell; FIG. 2 shows the honeycomb mesh, and FIG. 3 shows the honeycomb mesh in which the additional perforations are made to increase the optical transparency.

Figure 4A:
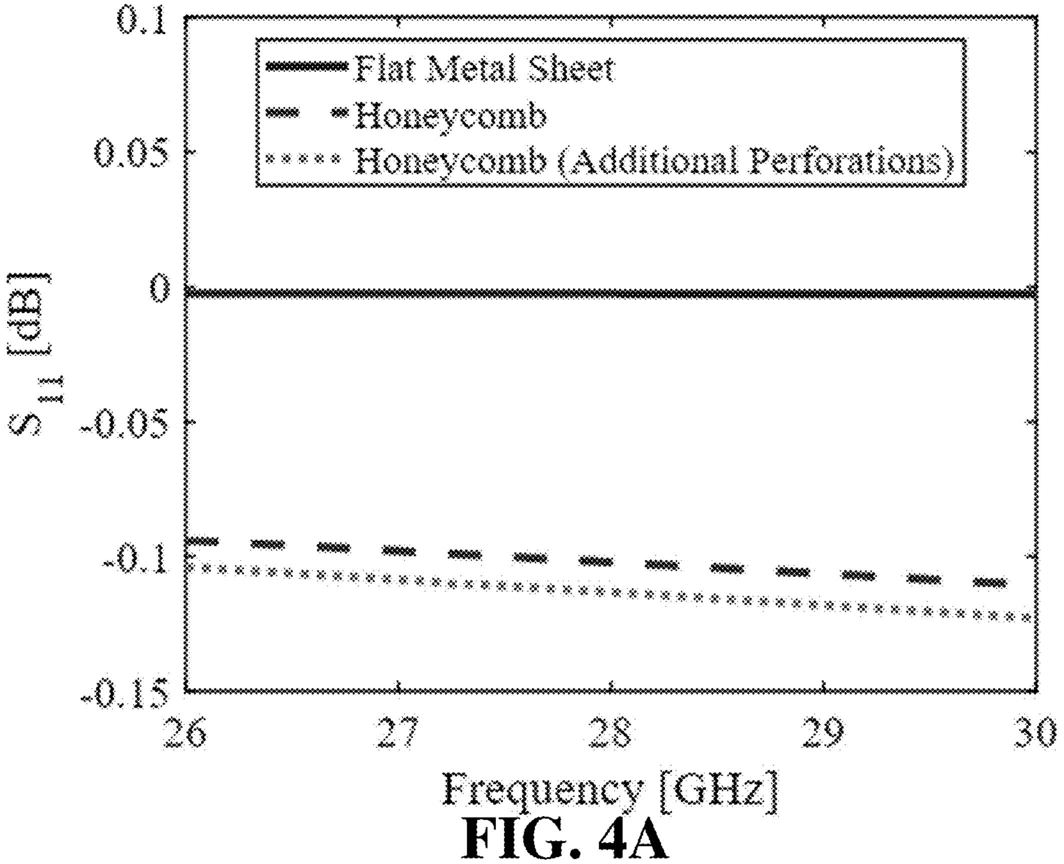
FIGS. 4A and 4B are example representations of the magnitude and phase reflection response, respectively, for the honeycomb ground plane and the honeycomb ground plane with additional perforations, in accordance with various example embodiments and implementations of the subject disclosure.
Figure 4B:
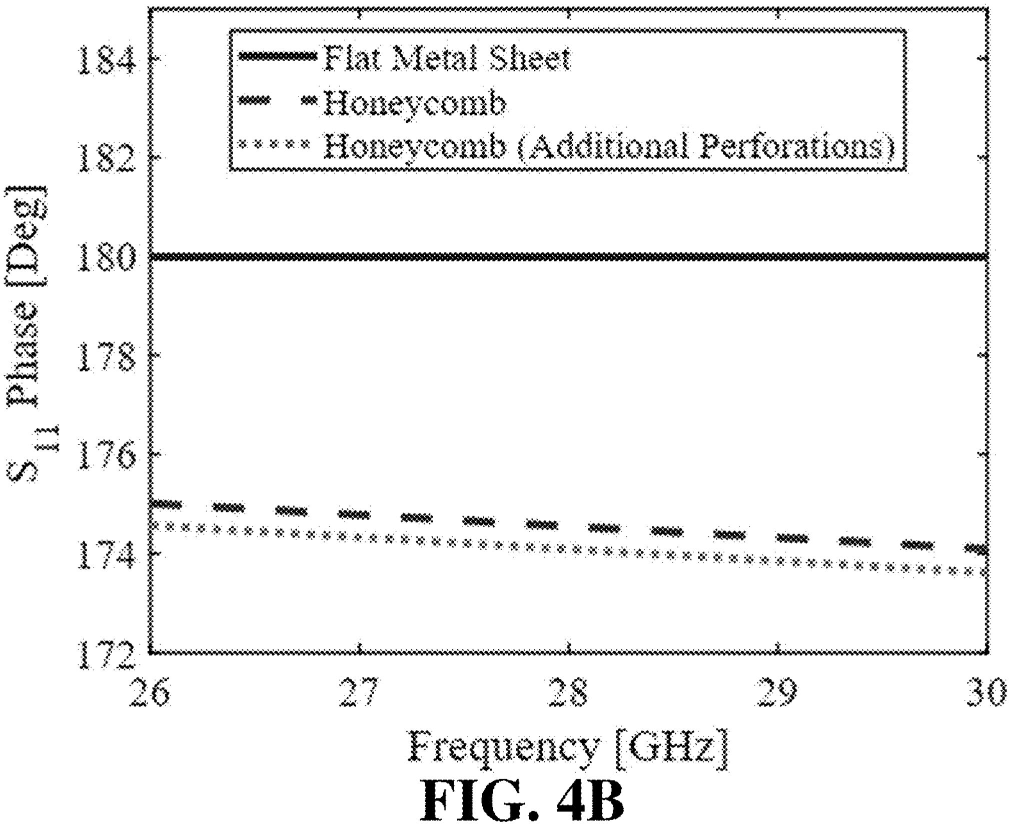

Simulations with Floquet-port excitations were performed to compare the reflections using the honeycomb mesh (FIG. 2) and the honeycomb mesh with additional perforations (FIG. 3) to that of a flat PEC sheet. The magnitude and phase of the reflected waves are shown in FIGS. 4A and 4B respectively, for the frequency range 26-30 GHz, which is the range within where the designed example metasurface reflector described herein operates. It is seen from FIGS. 4A and 4B that the magnitude and phase are approximately-0.1 dB and 175 degrees, respectively, in this frequency range, which is very close to the performance of a flat PEC.

The optical transparency (OT) of a meshed ground plane is $$OT = \frac{\text{Area of Perforations}}{\text{Area of a flat } PEC}.$$

The area of the perforations of the meshes in the example of FIG. 2 is 5.4437 $mm^2$ and 5.6412 $mm^2$ in the example of FIG. 3. The optical transparency of the unit cells' ground planes is then $$OT_{FIG. 2} = \frac{5.4437}{6.2085} = 87.68\%$$

$$OT_{FIG. 3} = \frac{5.6412}{6.2085} = 90.86\%.$$

A reflectarray using the honeycomb ground plane is designed to demonstrate its feasibility. More particularly, a reflector with a 2-D phase profile is designed with a honeycomb ground plane with an operating frequency of 28 GHz and a beam steering angle of $(\theta_b, \phi_b)=(30°, 0°)$.

The progressive phase distribution across the surface of a reflectarray to steer a beam in a direction $(\theta_b, \phi_b)$ can be determined with array theory. A reflectarray is typically fed by a horn antenna at a distance F away. To account for the spatial delay from the feed antenna, the $i^{th}$ element (positioned at $(x_i, y_i)$) in the reflectarray should be engineered to have a phase-shift ør of:

$$\phi_r(x_i, y_i) = k_0[d_i - (x_i\cos\phi_b + y_i\sin\phi_b)\sin\theta_b]$$

where $k_0$ is the free-space wave number and di is the distance of the $i^{th}$ element to the phase center of the feed antenna.

Figure 5:
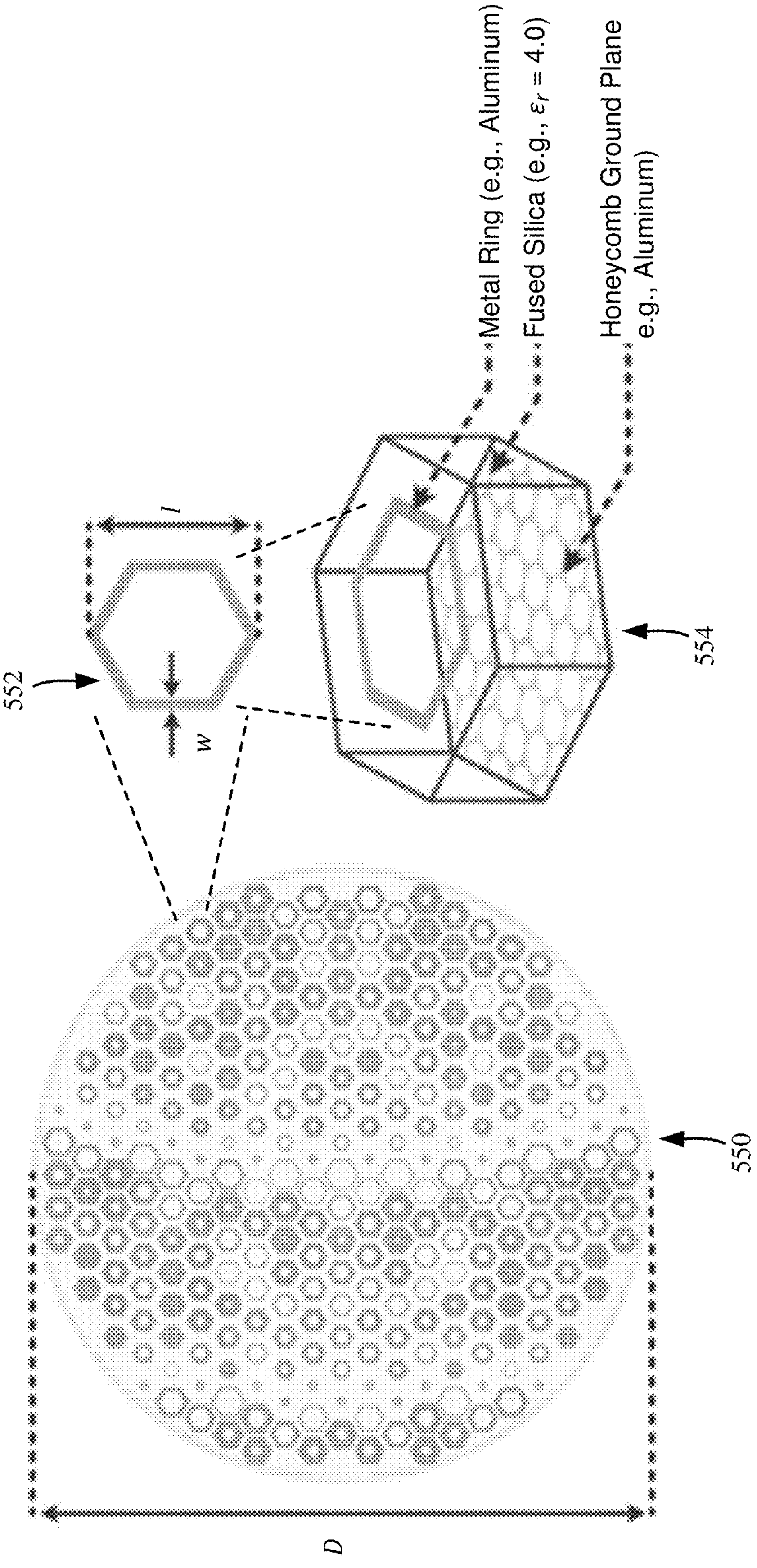
FIG. 5 shows various representations of an example metasurface (reflectarray) synthesized on a honeycomb ground plane, including resonator dimensions and an overall unit cell structure, in accordance with various example embodiments and implementations of the subject disclosure.

An example reflectarray 550 with a diameter D is synthesized on a honeycomb ground plane as shown in the left portion of FIG. 5, with a 2D phase gradient with $\theta_b$=30°. A resonator 552 with dimensions of/and w is shown in the upper right of FIG. 5, and the overall unit cell structure 554 is shown in the lower right of FIG. 5. In order to obtain desired phase profiles, in varied resonator geometries the ring lengths/were varied from 0.3 to 3 mm and widths varied from 0.1 to 1 mm, such as in the unit cell distribution pattern shown. The example reflectarray 550 was simulated in Ansys HFSS with Floquet-port excitations to measure the phase response.

Figure 6:
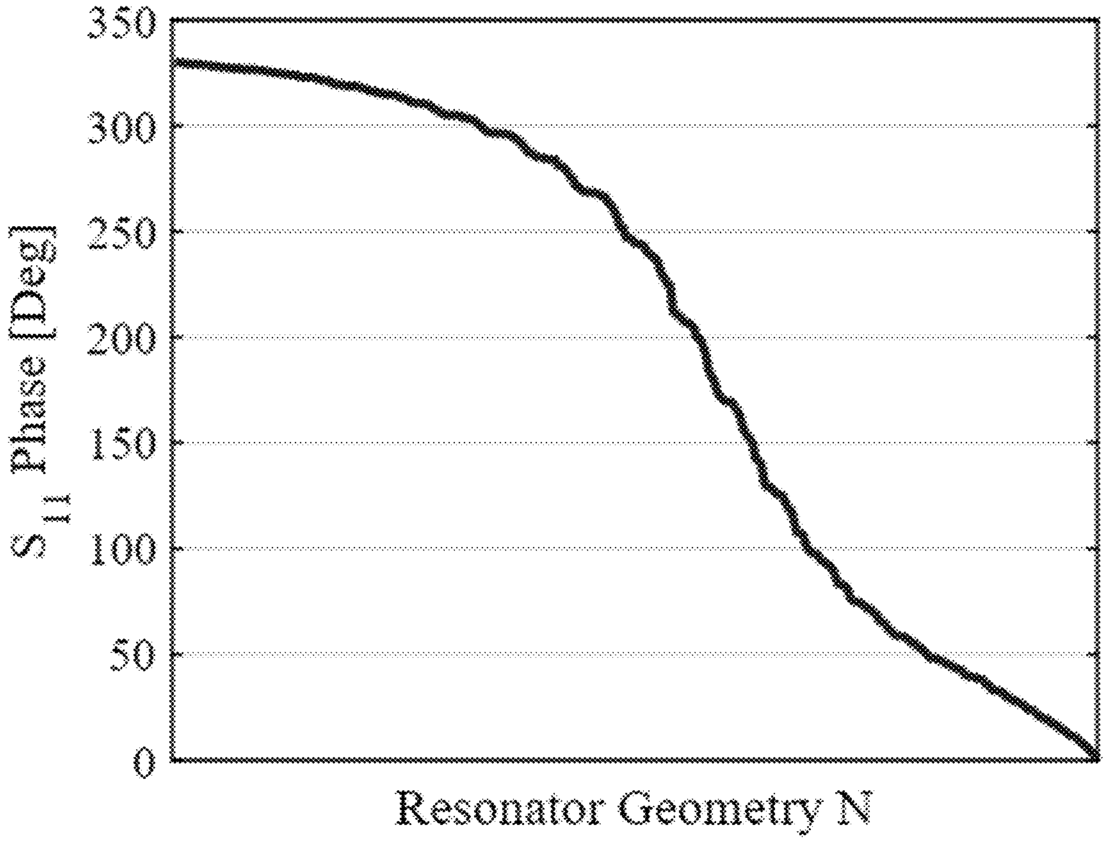
FIG. 6 shows a graphical representation of phase response using a honeycomb ground plane, in accordance with various example embodiments and implementations of the subject disclosure.

In FIG. 6, the phase response is shown for various geometries, and a phase range of 330 degrees was achieved. Note that while achieving a phase range of 360 degrees across all the scattering elements used in the reflector degrees is ideal, in practice, depending on various factors such as the substrate used and unit cell size, 360 degrees is typically not achievable; however a phase range of approximately 330 degrees as in FIG. 6 is a sufficiently large phase range, and is achievable with the honeycomb mesh ground plane.

Figure 7:
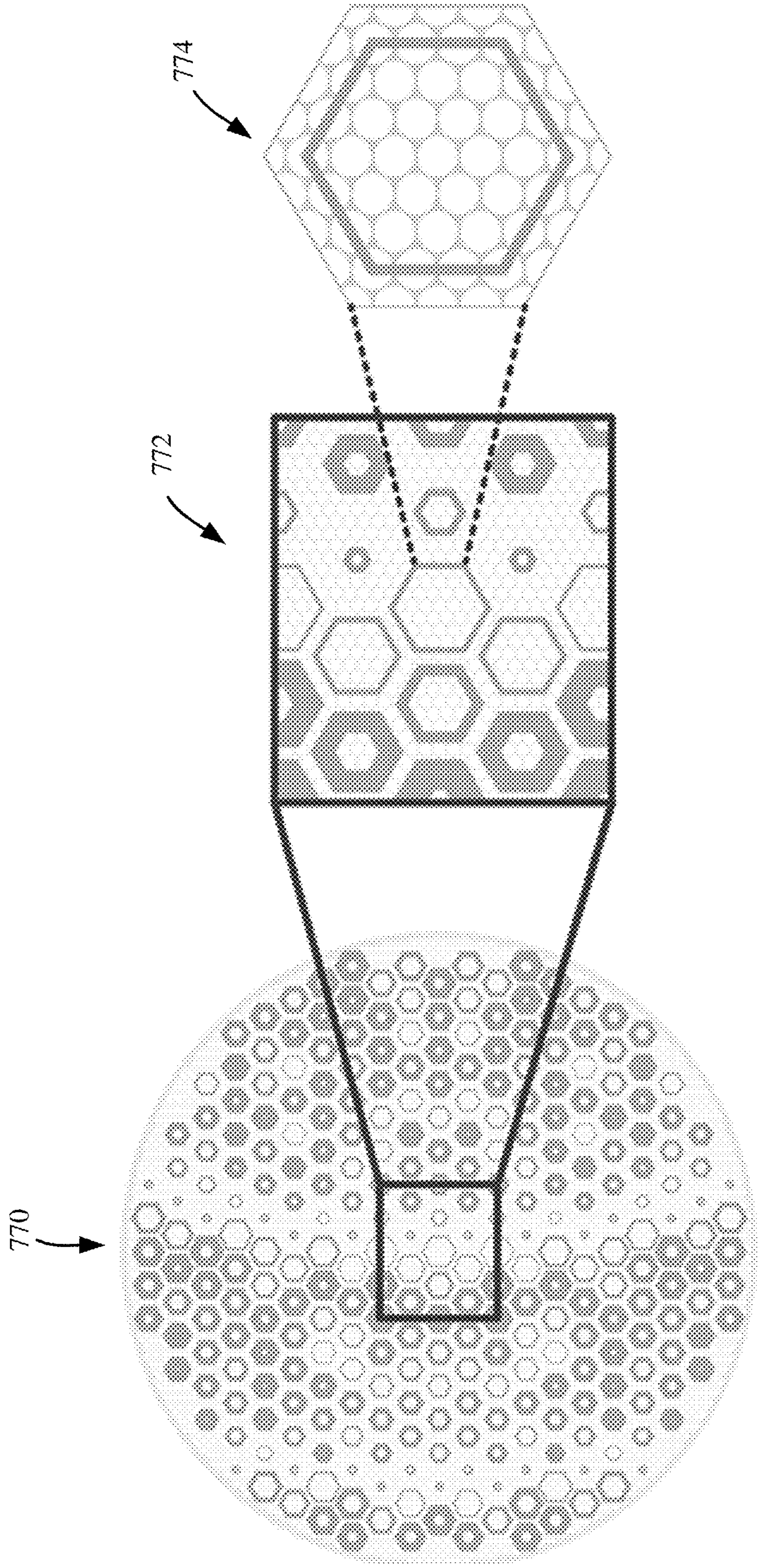
FIG. 7 shows a representation of an example metasurface synthesized on a honeycomb ground plane, including a zoomed-in view, and an enlarged view of one unit cell structure, in accordance with various example embodiments and implementations of the subject disclosure.

FIG. 7 shows an example metasurface 770 with a honeycomb mesh ground plane. A zoomed-in portion 772 of the metasurface 770 is shown on the right thereof, with one unit cell 774 enlarged to the right of the zoomed-in portion 772.

Figure 8:
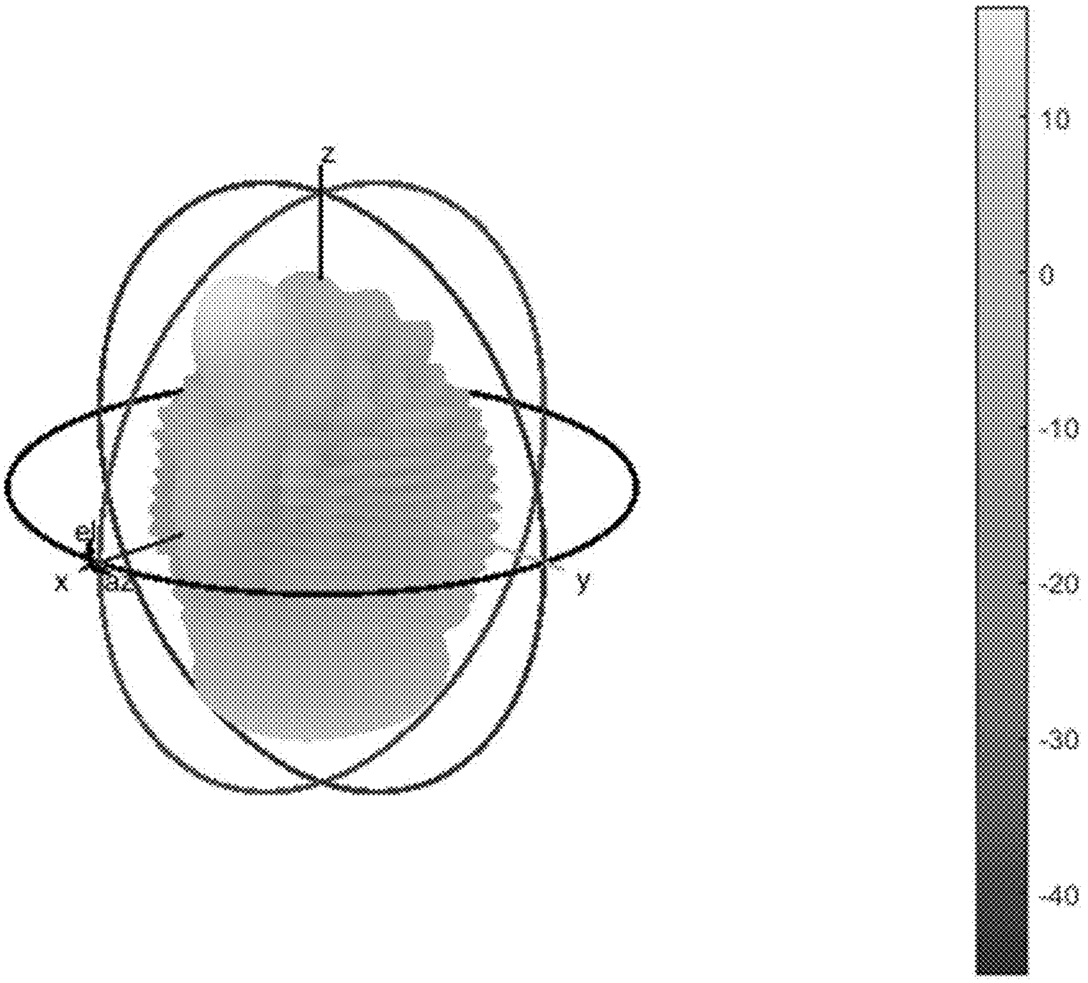
FIGS. 8, 9A-9B and 10 are example radiation pattern (gain) plots in rectangular and polar coordinates demonstrating performance of a metasurface with a honeycomb ground plane, in accordance with various example embodiments and implementations of the subject disclosure.
Figure 9A:
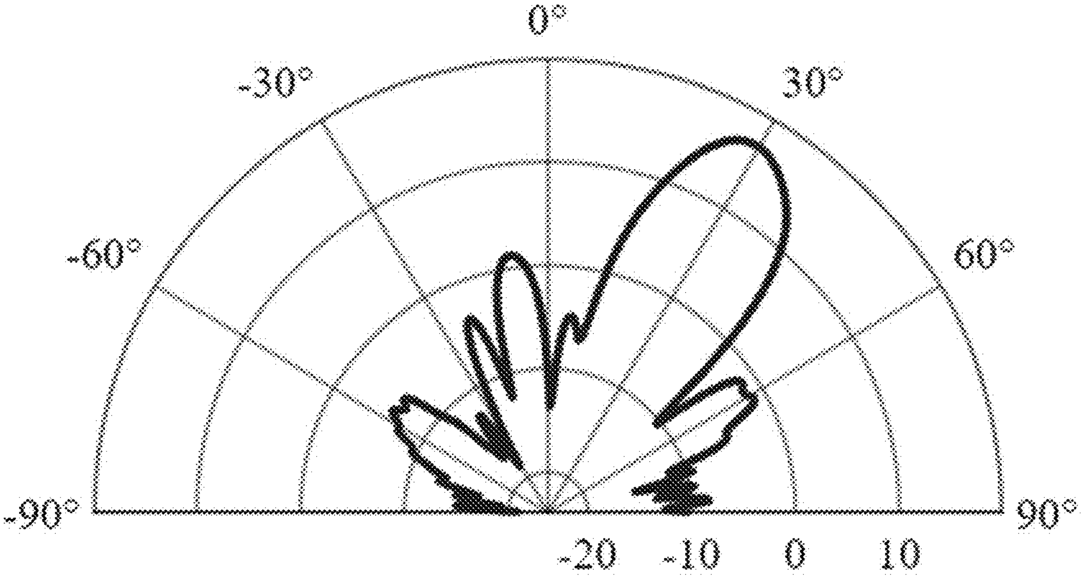
Figure 9B:
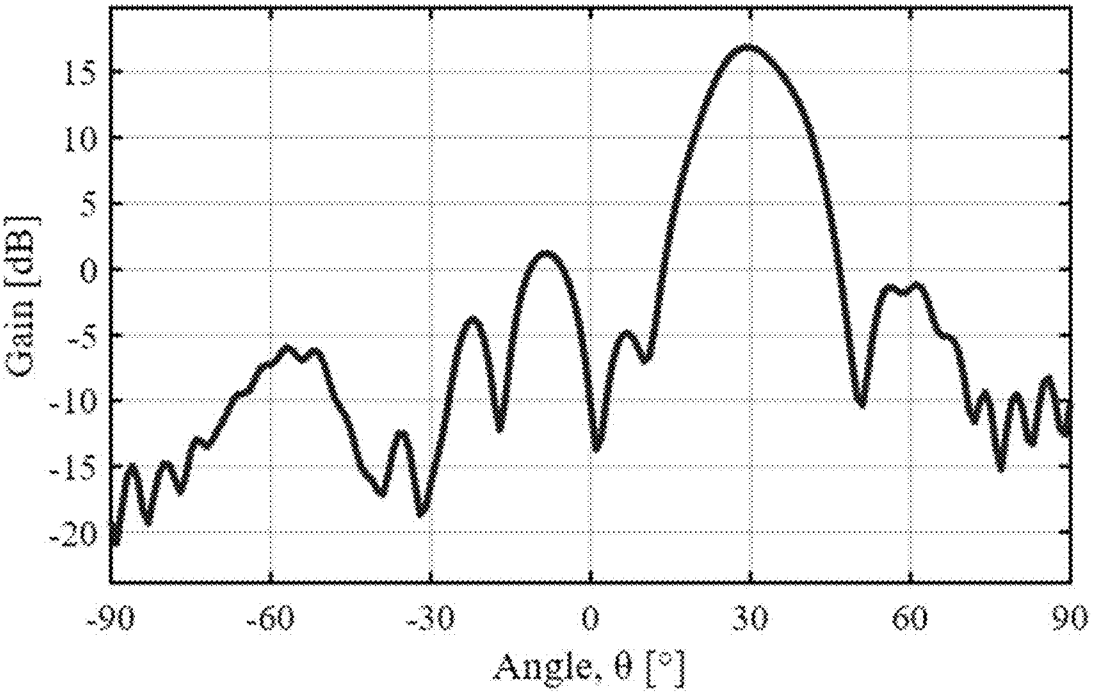
Figure 10:
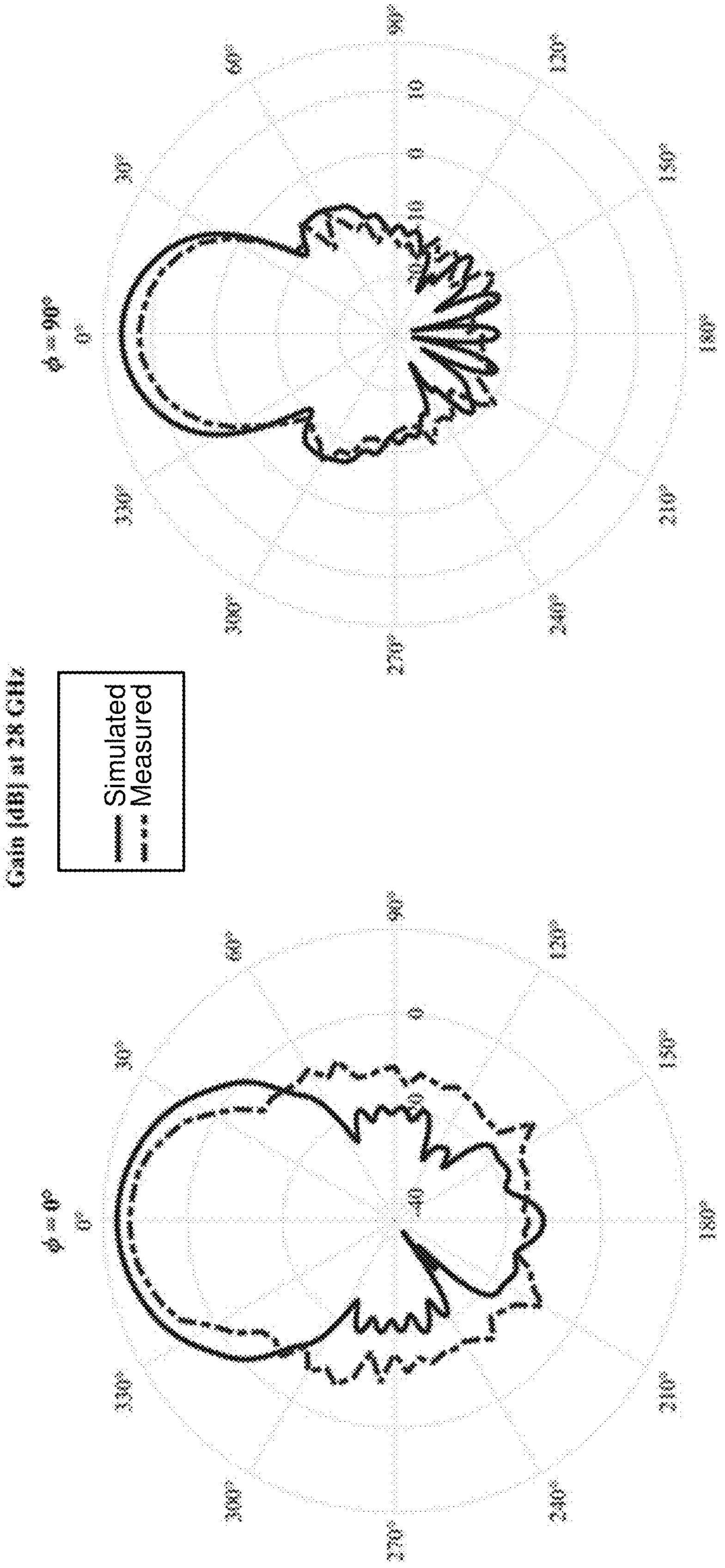

Example resulting radiation patterns are shown in FIGS. 8-10, including radiation pattern (gain) plots (in rectangular and polar coordinates) at $\phi$=0°. As can be seen, for an example design frequency of 28 GHz and designed beam steering direction $(\theta_b, \phi_b)=(30°, 0°)$, a peak gain of 17.0 dB and side lobe level of 13.52 dB is achieved.

In sum, for a reflector unit cell, using the honeycomb ground plane for optical transparency achieves a similar phase range to that of a flat ground plane. A transparent metasurface provides benefits and advantages in various use cases.

By way of examples, consider smart windows for urban buildings, such as a modern office building with large glass windows; an optically transparent reflective metasurface can be integrated into the glass panels. This allows the metasurface to redirect incoming mm-wave signals around obstacles like furniture or structural columns, ensuring reliable high-speed wireless connectivity throughout the office. Simultaneously, the transparent nature of the metasurface preserves the aesthetic appeal of the glass windows and allows natural light to enter the space, maintaining a bright and open environment.

In a retail setting, transparent displays used for digital signage can incorporate an optically transparent reflective metasurface. To enable the display to also function as a beamforming device, directing mm-wave signals to specific areas within the store to enhance wireless connectivity for customers. The metasurface remains substantially invisible to the naked eye, allowing the digital content on the display to be viewed without any significant interference, while simultaneously improving the store's wireless network performance.

In densely populated urban environments, installing optically transparent reflective metasurfaces on the surfaces of bus shelters, light poles, street lamps and so on can significantly improve wireless signal coverage. Such metasurfaces can direct signals to areas with poor reception, such as narrow streets or heavily congested zones, without obstructing visibility or altering the appearance of the infrastructure. This approach can enhance network reliability and coverage in challenging urban environments.

In modern vehicles equipped with transparent panoramic roofs, an optically transparent reflective metasurface can be within or near the glass to help in redirecting mm-wave signals within the vehicle, ensuring that occupants experience consistent and reliable in-car connectivity, even in areas with weak external signals. The transparency of the metasurface ensures that passengers can still enjoy unobstructed views through the panoramic roof, maintaining the vehicle's design aesthetics.

One or more example embodiments can be embodied in a unit cell, such as described and represented herein. The unit cell can include a reflecting element, including a metallic ring resonator configured to resonate based on a frequency of an impinging electromagnetic beam to reflect an instance of the impinging electromagnetic beam in a reflection direction, resulting in a reflected instance. The unit cell can include a mesh ground plane beneath the reflecting element, and the mesh ground plane can include electrically conductive portions surrounding a pattern of optically transparent openings in the mesh ground plane, in which the unit cell can be substantially optically transparent based on a characteristic of the mesh ground plane and dimensions of the reflecting element.

The unit cell can include an optically transparent or substantially optically transparent substrate beneath the mesh ground plane.

The reflecting element can include a hexagonal ring resonator.

The electrically conductive portions surrounding the pattern of optically transparent openings can form a honeycomb lattice.

The openings in the mesh ground plane can be symmetrically distributed or substantially symmetrically distributed.

The metallic ring resonator can be dimensioned to determine a phase response of the unit cell corresponding to the reflection direction.

The metallic ring resonator can determine a phase response of the unit cell corresponding to the reflection direction based on at least one of: a size of the metallic ring resonator, or a width of the metallic ring resonator.

The unit cell can include perforations in the electrically conductive portions between at least some of the openings.

The unit cell can be part of a metasurface of unit cells including the unit cell and a group of other unit cells.

The reflected instance of the impinging electromagnetic beam can constructively interfere with respective other reflected instances of respective other unit cells of the group of other unit cells, to result in constructive interference that beamforms a beamformed beam reflected from the metasurface based on the impinging electromagnetic beam.

The mesh ground plane can be at least eighty percent optically transparent.

The frequency of the impinging electromagnetic beam can be within a millimeter wave frequency spectrum.

One or more example embodiments can be embodied in a device, such as described and represented herein. The device can include a substantially optically transparent reflective surface, the reflective surface can include respective unit cells arranged on a plane, and the respective unit cells can include a unit cell. The unit cell can include a metallic resonator, a mesh ground plane that can include a lattice of distributed openings beneath the metallic resonator, and a portion of an optically transparent or substantially optically transparent substrate beneath the mesh ground plane.

The lattice of distributed openings can include a lattice of hexagonal structures, and perforations between at least some of the distributed openings.

The device can include a metasurface having a phase profile that reflects an impinging electromagnetic wave as a beamformed reflected beam, and the phase profile can be based on at least one of: respective dimensions of the unit cells, respective widths of respective metallic resonators of the unit cells, or a distribution of the respective unit cells.

At least one of: the metallic resonator can include a hexagonally-shaped ring resonator, or the distributed openings can include circular openings.

One or more example embodiments can be embodied in a metasurface, such as described and represented herein. The metasurface can include an array of unit cells arranged to reflect a reflected beamformed instance of an impinging electromagnetic wave, in which the array of unit cells can include a subarray comprising at least some of the unit cells; the subarray can be substantially optically transparent. The metasurface can include a first unit cell of the subarray, which can include a first metallic resonator, a first mesh ground plane area including a first honeycomb lattice of first openings beneath the first metallic resonator, and a first portion of an optically transparent or substantially optically transparent substrate beneath the first mesh ground plane. The metasurface can include a second unit cell of the subarray, the second unit cell including a second metallic resonator, a second mesh ground plane area comprising a second honeycomb lattice of second distributed openings beneath the second metallic resonator, and a second portion of the optically transparent or substantially optically transparent substrate beneath the second mesh ground plane. The first metallic resonator and the first mesh ground plane area can correspond to a first phase response that reflects a first portion of the impinging beam in a first reflection direction, and the second metallic resonator and the second mesh ground plane area correspond to a second phase response that reflects a second portion of the impinging beam in a second reflection direction. The first reflection direction and the second reflection direction constructively interfere as part of the reflected beamformed instance.

The first honeycomb lattice can include perforations between at least some of the first openings.

The first phase profile can be based on at least one of: a length of the first metallic resonator, or a width of one side of the first metallic resonator.

The subarray can be symmetrically distributed over a region of the metasurface.

As can be seen, described herein is a highly optically transparent metasurface that is practical to implement and facilitates significant advancements in wireless communication systems. The metasurface is based on a unit-cell design, which can include a single layer of ring resonators over a honeycomb-mesh ground plane that is implemented to increase optical transparency. The substrate is also optically transparent. In one implementation, a phase range of 330 degrees is achieved, with ground plane optical transparency of higher than eighty percent.

What has been described herein includes mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A unit cell, comprising:

a reflecting element, comprising a metallic ring resonator configured to resonate based on a frequency of an impinging electromagnetic beam to reflect an instance of the impinging electromagnetic beam in a reflection direction, resulting in a reflected instance;

a mesh ground plane beneath the reflecting element, the mesh ground plane comprising electrically conductive portions surrounding a pattern of optically transparent openings in the mesh ground plane, wherein the unit cell is substantially optically transparent based on a characteristic of the mesh ground plane and dimensions of the reflecting element; and perforations in the electrically conductive portions between at least some openings of the optically transparent openings.

2. The unit cell of claim 1, further comprising an optically transparent or substantially optically transparent substrate between the reflecting element and the mesh ground plane.

3. The unit cell of claim 1, wherein the reflecting element comprises a hexagonal ring resonator.

4. The unit cell of claim 1, wherein the electrically conductive portions surrounding the pattern of optically transparent openings form a honeycomb lattice.

5. The unit cell of claim 1, wherein the openings in the mesh ground plane are symmetrically distributed or substantially symmetrically distributed.

6. The unit cell of claim 1, wherein the metallic ring resonator is dimensioned to determine a phase response of the unit cell corresponding to the reflection direction.

7. The unit cell of claim 1, wherein the metallic ring resonator determines a phase response of the unit cell corresponding to the reflection direction based on at least one of: a size of the metallic ring resonator, or a width of the metallic ring resonator.

8. The unit cell of claim 1, wherein the unit cell is part of a metasurface of unit cells comprising the unit cell and a group of other unit cells.

9. The unit cell of claim 8, wherein the reflected instance of the impinging electromagnetic beam constructively interferes with respective other reflected instances of respective other unit cells of the group of other unit cells, to result in constructive interference that beamforms a beamformed beam reflected from the metasurface based on the impinging electromagnetic beam.

10. The unit cell of claim 1, wherein the mesh ground plane is at least eighty percent optically transparent.

11. The unit cell of claim 1, wherein the frequency of the impinging electromagnetic beam is within a millimeter wave frequency spectrum.

12. A device, comprising:

a substantially optically transparent reflective surface comprising respective unit cells arranged on a plane, the respective unit cells comprising a unit cell, and the unit cell comprising:

a metallic resonator;

a mesh ground plane comprising a lattice of distributed openings beneath the metallic resonator; and a portion of an optically transparent or substantially optically transparent substrate between the metallic resonator and the mesh ground plane, wherein the lattice of distributed openings comprises a lattice of hexagonal structures, and perforations between at least some of distributed openings of the lattice of distributed openings.

13. The device of claim 12, wherein the device comprises a metasurface comprising a phase profile that reflects an impinging electromagnetic wave as a beamformed reflected beam, and wherein the phase profile is based on at least one of: respective dimensions of the unit cells, respective widths of respective metallic resonators of the unit cells, or a distribution of the respective unit cells.

14. The device of claim 13, wherein a frequency of the impinging electromagnetic wave is within a millimeter wave frequency spectrum.

15. The device of claim 12, wherein at least one of: the metallic resonator comprises a hexagonally-shaped ring resonator, or the distributed openings comprise circular openings.

16. The device of claim 12, wherein the mesh ground plane is at least eighty percent optically transparent.

17. A metasurface, comprising:

an array of unit cells arranged to reflect a reflected beamformed instance of an impinging electromagnetic wave, the array of unit cells comprising a subarray comprising at least some unit cells of the array of unit cells, wherein the subarray is substantially optically transparent;

a first unit cell of the subarray, the first unit cell comprising:

a first metallic resonator, a first mesh ground plane area comprising a first honeycomb lattice of first openings beneath the first metallic resonator, a first portion of an optically transparent or substantially optically transparent substrate between the first metallic resonator and the first mesh ground plane area; and a second unit cell of the subarray, the second unit cell comprising:

a second metallic resonator, a second mesh ground plane area comprising a second honeycomb lattice of second distributed openings beneath the second metallic resonator, and a second portion of the optically transparent or substantially optically transparent substrate between the second metallic resonator and the second mesh ground plane area, wherein the first metallic resonator and the first mesh ground plane area correspond to a first phase response that reflects a first portion of the impinging electromagnetic wave in a first reflection direction, wherein the second metallic resonator and the second mesh ground plane area correspond to a second phase response that reflects a second portion of the impinging electromagnetic wave in a second reflection direction, wherein the first reflection direction and the second reflection direction constructively interfere as part of the reflected beamformed instance, and wherein the first honeycomb lattice of first openings comprises perforations between at least some of the first openings.

18. The metasurface of claim 17, wherein the first phase response is based on at least one of: a length of the first metallic resonator, or a width of one side of the first metallic resonator.

19. The metasurface of claim 17, wherein the subarray is symmetrically distributed over a region of the metasurface.

20. The metasurface of claim 17, wherein the first mesh ground plane area and the second mesh ground plane area are at least eighty percent optically transparent.

* * * * *